(12) United States Patent
Imanishi

(10) Patent No.: US 10,294,998 B2
(45) Date of Patent: May 21, 2019

(54) CLUTCH DEVICE

(71) Applicant: EXEDY Corporation, Neyagawa-shi, Osaka (JP)

(72) Inventor: Yoshio Imanishi, Neyagawa (JP)

(73) Assignee: EXEDY CORPORATION, Neyagawa-Shi, Osaka (JP)

(*) Notice: Subject to any disclaimer, the term of this patent is extended or adjusted under 35 U.S.C. 154(b) by 17 days.

(21) Appl. No.: 15/549,308

(22) PCT Filed: Feb. 26, 2016

(86) PCT No.: PCT/JP2016/055775
§ 371 (c)(1),
(2) Date: Aug. 7, 2017

(87) PCT Pub. No.: WO2016/143551
PCT Pub. Date: Sep. 15, 2016

(65) Prior Publication Data
US 2018/0031054 A1 Feb. 1, 2018

(30) Foreign Application Priority Data

Mar. 9, 2015 (JP) .................................. 2015-045635

(51) Int. Cl.
*F16D 13/52* (2006.01)
*F16D 13/56* (2006.01)
(Continued)

(52) U.S. Cl.
CPC ............. *F16D 23/12* (2013.01); *F16D 13/52* (2013.01); *F16D 13/56* (2013.01); *F16D 13/70* (2013.01);
(Continued)

(58) Field of Classification Search
CPC .... F16D 23/12; F16D 2023/123; F16D 13/52; F16D 13/54; F16D 13/56; F16D 13/70; F16D 2013/565
See application file for complete search history.

(56) References Cited

U.S. PATENT DOCUMENTS 5,551,927 A * 9/1996 Enzmann ................ B25B 21/00
    464/39
5,617,938 A * 4/1997 Tsukada .................. F16D 13/52
    192/54.5
(Continued)

FOREIGN PATENT DOCUMENTS

CN      1129295 A    8/1996
CN    201281091 Y    7/2009
(Continued)

OTHER PUBLICATIONS

International Search Report dated May 24, 2016 for corresponding foreign Application No. PCT/JP2016/055775, 2 pp.
(Continued)

*Primary Examiner* — Jacob S. Scott
*Assistant Examiner* — James J Taylor, II
(74) *Attorney, Agent, or Firm* — United IP Counselors, LLC

(57) ABSTRACT

A clutch device includes a first rotary member, a second rotary member, a clutch part, a support member, and a cam mechanism. The cam mechanism separates the support member and the second rotary member away from each other in the axial direction when the support member and the second rotary member are rotated relatively to each other. The cam mechanism includes a first cam surface, a second cam surface, a third cam surface and a fourth cam surface. The first and second cam surfaces are included in the support member. The third and fourth cam surfaces are included in the second rotary member. The first and second cam surfaces (Continued)

tilt to face axially inside and face oppositely to each other in a circumferential direction. The third cam surface is opposed to the first cam surface. The fourth cam surface is opposed to the second cam surface.

5 Claims, 4 Drawing Sheets

(51) Int. Cl.
*F16D 13/70* (2006.01)
*F16D 23/12* (2006.01)

(52) U.S. Cl.
CPC .. *F16D 2013/565* (2013.01); *F16D 2023/123* (2013.01)

(56) References Cited

U.S. PATENT DOCUMENTS

| | | | |
|---|---|---|---|
| 10,012,272 B2 | 7/2018 | Imanishi | |
| 2007/0221465 A1* | 9/2007 | Okada | F16D 13/04 192/70.27 |
| 2009/0071792 A1* | 3/2009 | Kataoka | F16D 13/04 192/93 R |
| 2010/0078285 A1 | 4/2010 | Yoshitsugu et al. | |
| 2011/0024256 A1 | 2/2011 | Gokan et al. | |
| 2014/0235407 A1 | 8/2014 | Masayuki | |
| 2014/0353108 A1* | 12/2014 | Tokumoto | F16D 13/56 192/66.31 |
| 2017/0159725 A1* | 6/2017 | Imanishi | F16D 13/52 |
| 2018/0031053 A1* | 2/2018 | Imanishi | F16D 13/52 |

FOREIGN PATENT DOCUMENTS

| | | |
|---|---|---|
| CN | 201517568 U | 6/2010 |
| CN | 103890427 A | 6/2014 |
| CN | 104169601 A | 11/2014 |
| DE | 102010032514 A1 | 2/2011 |
| EP | 2169247 A2 | 3/2010 |
| EP | 2778457 A1 | 9/2014 |
| JP | S5491654 A | 7/1979 |
| JP | H11270652 A | 10/1999 |
| JP | 2001107989 A | 4/2001 |
| JP | 2007187244 A | 7/2007 |
| JP | 2010084857 A | 4/2010 |
| JP | 2011033106 A | 2/2011 |
| JP | 4907642 B2 | 4/2012 |
| JP | 2013096421 A | 5/2013 |
| JP | 2013185675 B1 | 8/2013 |
| WO | 2013062063 A1 | 5/2013 |
| WO | 2013133364 A1 | 9/2013 |
| WO | 2014157631 A1 | 10/2014 |

OTHER PUBLICATIONS

International Search Report dated Feb. 9, 2016 for Application No. PCT/JP2016/050768, 2 pp.
U.S. Appl. No. 15/549,247, filed Aug. 7, 2017, Exedy Corporation.
First Office Action of the Chinese patent application No. 2016800127067, dated Nov. 5, 2018, 6 pp.
First Office Action of the corresponding Chinese patent application No. 201680014292.1, dated Sep. 30, 2018, 6 pp.
Non-Final Office Action of the related U.S. Appl. No. 15/549,247, dated Oct. 22, 2018, 15 pp.

* cited by examiner

CLUTCH DEVICE

CROSS-REFERENCE TO RELATED APPLICATIONS

This application is the U.S. National Phase of PCT International Application No. PCT/JP2016/055775, filed on Feb. 26, 2016. That application claims priority to Japanese Patent Application No. 2015-045635, filed Mar. 9, 2015. The contents of both applications are herein incorporated by reference in their entirety.

BACKGROUND

Technical Field

The present invention relates to a clutch device.

Background Information

In general, motorcycles (a two-wheeled motorcycle, a buggy, etc.) use a clutch device so as to allow or block transmission of power from an engine to a transmission. The clutch device includes a clutch housing, a clutch center, a clutch part and a pressure plate. The clutch housing is coupled to an engine crankshaft side. The clutch center is coupled to a transmission side. The clutch part is disposed between the clutch housing and the clutch center so as to allow or block transmission of power. The pressure plate is provided for pressing the clutch part.

A clutch device described in Japan Laid-open Patent Application Publication No. 2013-96421 includes cam mechanisms for increasing a press-contact force applied by the clutch center and the pressure plate. Each cam mechanism is composed of gradient surfaces of an opening and those of a protrusion disposed within the opening.

BRIEF SUMMARY

In the aforementioned clutch device, the opening is required to have a larger circumferential dimension than the protrusion so as to dispose the protrusion therein. Hence, this causes a drawback that large gaps are inevitably produced between the gradient surfaces of the protrusion and those of the opening.

It is an object of the present invention to provide a clutch device in which an interval between opposed cam surfaces can be made small.

A clutch device according to an aspect of the present invention includes a first rotary member, a second rotary member, a clutch part, a support member and a cam mechanism. The first rotary member includes a first pressure applying part. The first rotary member is disposed to be rotatable about a rotational axis. The second rotary member includes a second pressure applying part disposed at an interval from the first pressure applying part in an axial direction. The second rotary member is disposed to be rotatable about the rotational axis. Additionally, the second rotary member is disposed outside the first rotary member in the axial direction. The clutch part is disposed between the first pressure applying part and the second pressure applying part. The clutch part is configured to allow and block transmission of a power. The support member is disposed outside the second rotary member in the axial direction. The support member is configured to be rotated unitarily with the first rotary member. The cam mechanism is configured to separate the support member and the second rotary member away from each other in the axial direction when the support member and the second rotary member are rotated relatively to each other. The cam mechanism includes first to fourth cam surfaces. The first and second cam surfaces are included in the support member. The third and fourth cam surfaces are included in the second rotary member. The first and second cam surfaces tilt to face axially inside and face oppositely to each other in a circumferential direction. The third cam surface is opposed to the first cam surface. The fourth cam surface is opposed to the second cam surface.

According to this configuration, the first and second cam surfaces are included in the support member and tilt to face axially inside. Additionally, the third and fourth cam surfaces are included in the second rotary member and tilt to face axially outside. Therefore, in a condition that the first and second cam surfaces are disposed between the third and fourth cam surfaces, the minimum distance between the third cam surface and the fourth cam surface can be made smaller than the maximum distance between the first cam surface and the second cam surface. As a result, the interval between the first cam surface and the third cam surface can be made small. Additionally, the interval between the second cam surface and the fourth cam surface can be also made small.

Preferably, the clutch device further includes an urging member. The urging member is disposed between the second rotary member and the support member. The urging member urges the second rotary member and the support member so as to separate the second rotary member and the support member away from each other in the axial direction.

The first rotary member can be provided as a pressure plate disposed to be movable in the axial direction. Additionally, the second rotary member can be provided as a clutch center disposed to be immovable in the axial direction.

Alternatively, the first rotary member may be a clutch center disposed to be immovable in the axial direction. Additionally, the second rotary member may be a pressure plate disposed to be movable in the axial direction.

Preferably, the support member includes a first cam part protruding axially inside. One of circumferential end surfaces of the first cam part is the first cam surface. The other of the circumferential end surfaces of the first cam part is the second cam surface. The second rotary member includes a second cam part recessed axially inside. One of circumferential inner wall surfaces of the second cam part is the third cam surface. The other of the circumferential inner wall surfaces of the second cam part is the fourth cam surface.

According to the present invention, an interval between opposed cam surfaces can be made small.

DETAILED DESCRIPTION OF EMBODIMENTS

Figure 1:
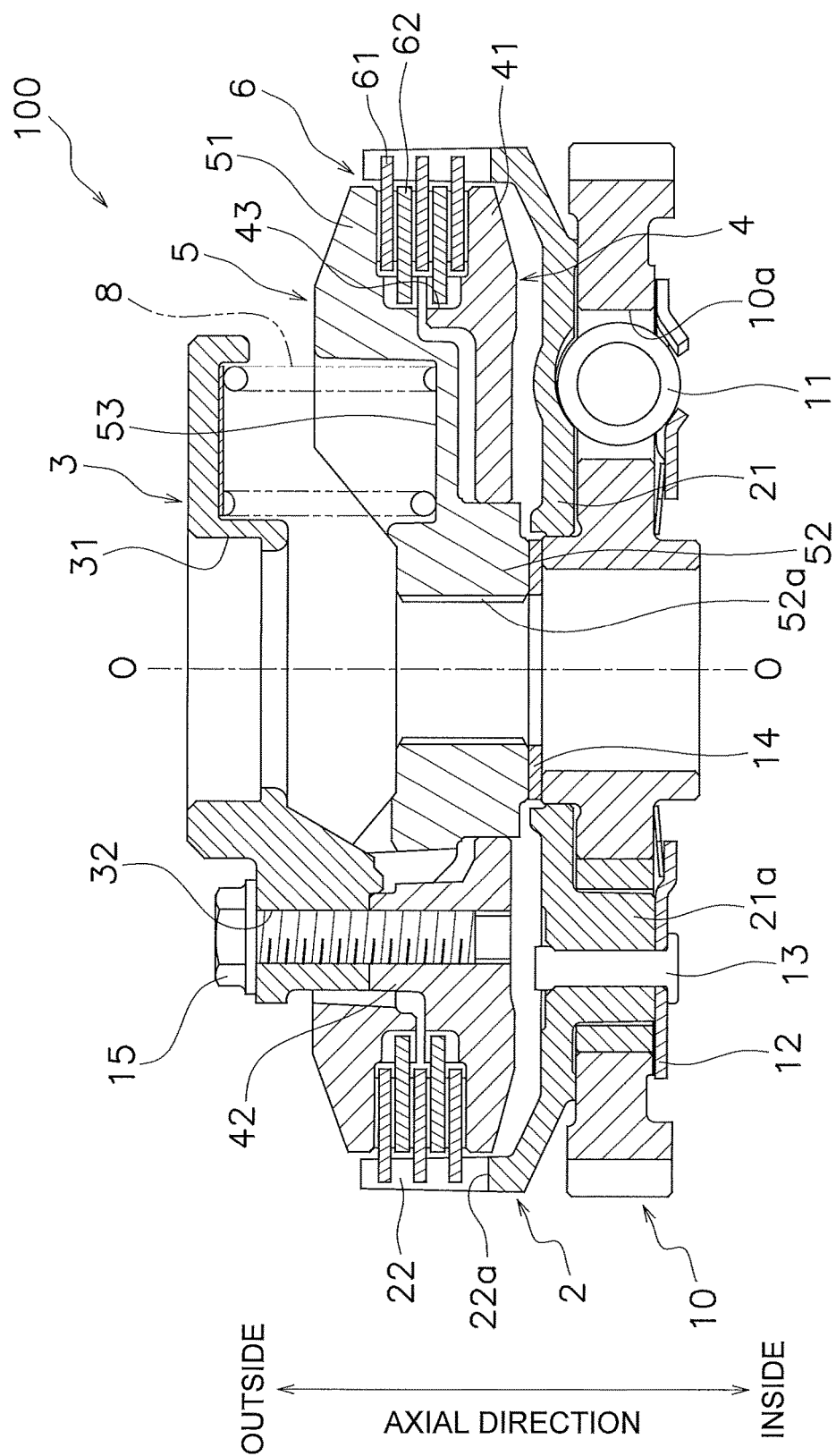
FIG. 1 is a cross-sectional view of a clutch device.
Figure 2:
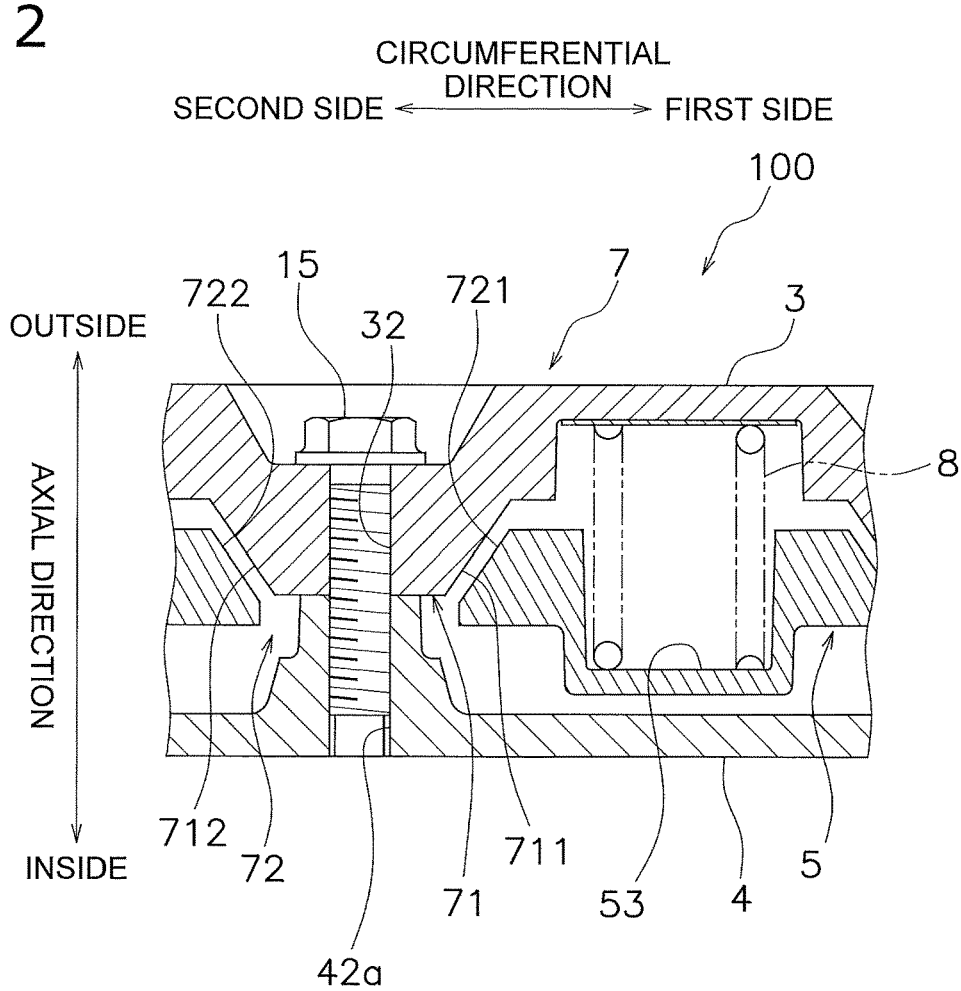
FIG. 2 is a cross-sectional view of a cam mechanism.

An embodiment of a clutch device according to the present invention will be hereinafter explained with reference to drawings. It should be noted that the clutch device according to the present exemplary embodiment is used in a motorcycle. FIG. 1 is a cross-sectional view of the clutch device, whereas FIG. 2 is a cross-sectional view of the clutch device in which a cam mechanism is mainly focused. It should be noted that in the following explanation, the term "rotational axis" means a rotational axis O of the clutch device. On the other hand, the term "axial direction" means an extending direction of the rotational axis O of the clutch device. The term "axially outside" means a side separating from an input gear 10, whereas the term "axially inside" means a side close to the input gear 10. Specifically, the upper side in FIG. 1 corresponds to the axially outside, whereas the lower side in FIG. 1 corresponds to the axially inside. Yet on the other hand, the term "circumferential direction" means a circumferential direction of an imaginary circle about the rotational axis O, whereas the team "radial direction" means a radial direction of the imaginary circle about the rotational axis O.

[Clutch Device]

As shown in FIGS. 1 and 2, a clutch device 100 is configured to allow or block transmission of power from an engine to a transmission. The clutch device 100 includes a clutch housing 2, a lifter plate 3 (an exemplary support member), a pressure plate 4 (an exemplary first rotary member), a clutch center 5 (an exemplary second rotary member), a clutch part 6 and a cam mechanism 7. Additionally, the clutch device 100 further includes a plurality of urging members 8.

[Clutch Housing]

The clutch housing 2 includes a disc part 21 and a tubular part 22, and is coupled to the input gear 10. The input gear 10 is an approximately annular member to which the power generated by the engine (not shown in the drawings) is inputted. The input gear 10 is meshed with a drive gear (not shown in the drawings) fixed to an engine-side crankshaft.

The disc part 21 includes a plurality of protrusions 21a that protrude axially inside while being aligned at intervals in the circumferential direction. The input gear 10 is coupled to the disc part 21 through a plurality of coil springs 11. The plural protrusions 21a of the disc part 21 and the plural coil springs 11 are inserted into a hole 10a included in the input gear 10. Additionally, the clutch housing 2 and the input gear 10 are coupled through a plate 12 and rivets 13. The coil springs 11 are provided for absorbing vibration from the engine.

The tubular part 22 extends axially outside from the outer peripheral edge of the disc part 21. The tubular part 22 includes a plurality of cutouts 22a that extend in the axial direction while being aligned at intervals in the circumferential direction.

[Lifter Plate]

The lifter plate 3 is disposed axially outside the clutch center 5. The lifter plate 3 is unitarily rotated with the pressure plate 4. The lifter plate 3 has a substantially disc shape and includes an opening 31 in the middle part thereof. A release mechanism (not shown in the drawings) is coupled to the opening 31. The lifter plate 3 is coupled to the pressure plate 4. The lifter plate 3 includes a plurality of through holes 32. The through holes 32 are disposed at intervals in the circumferential direction. Additionally, the through holes 32 extend in the axial direction. Bolts 15 extend while penetrating the through holes 32. It should be noted that the through holes 32 penetrate first cam parts 71 to be described. It should be noted that the lifter plate 3 also has a function of a support member in the present invention. In other words, the lifter plate 3 supports the urging members 8 as the support member.

[Pressure Plate]

The pressure plate 4 is disposed at an interval from the lifter plate 3 in the axial direction. Additionally, the pressure plate 4 is disposed radially inside the tubular part 22 of the clutch housing 2.

The pressure plate 4 includes a first pressure applying part 41. The pressure plate 4 has a disc shape and the outer peripheral part thereof corresponds to the first pressure applying part 41. The first pressure applying part 41 has an annular shape. The first pressure applying part 41 faces axially outside. In other words, the first pressure applying part 41 faces toward the lifter plate 3 in the axial direction.

The pressure plate 4 is attached to a boss 52 of the clutch center 5 to be described. Specifically, the pressure plate 4 includes an opening in the middle part thereof. The boss 52 of the clutch center 5 is fitted to the opening of the pressure plate 4. The pressure plate 4 is movable in the axial direction. In other words, the pressure plate 4 slides on the boss 52 of the clutch center 5 in the axial direction. Additionally, the pressure plate 4 is disposed to be rotatable about the rotational axis O. The pressure plate 4 is rotatable relatively to the clutch center 5.

The pressure plate 4 includes a plurality of screw holes 42a. Detailedly, the pressure plate 4 includes a plurality of protrusions 42, each of which includes the screw hole 42a extending in the axial direction. The respective protrusions 42 protrude axially outside. The respective protrusions 42 are disposed at equal intervals in the circumferential direction. The protrusions 42 axially extend inside second cam parts 72 to be described, respectively.

The bolts 15 are screwed into the screw holes 42a of the protrusions 42 of the pressure plate 4, respectively. With this configuration, the lifter plate 3 and the pressure plate 4 are unitarily rotated while being fixed to each other. Additionally, the lifter plate 3 and the pressure plate 4 are unitarily moved in the axial direction. It should be noted that the lifter plate 3 and the pressure plate 4 are movable relatively to the clutch center 5 in the axial direction.

[Clutch Center]

The clutch center 5 is disposed to be rotatable about the rotational axis O. The clutch center 5 is disposed axially outside the pressure plate 4. Additionally, the clutch center 5 is disposed axially between the lifter plate 3 and the pressure plate 4. The clutch center 5 is disposed radially inside the tubular part 22 of the clutch housing 2.

The clutch center 5 includes a second pressure applying part 51. The second pressure applying part 51 is included in the outer peripheral part of the clutch center 5. The second pressure applying part 51 has an annular shape. The second pressure applying part 51 faces axially inside. In other words, the second pressure applying part 51 faces toward the pressure plate 4 in the axial direction. The second pressure applying part 51 is disposed at an interval from the first pressure applying part 41 in the axial direction. The second pressure applying part 51 is opposed to the clutch part 6. The clutch part 6 is disposed between the first pressure applying part 41 and the second pressure applying part 51. In other words, the first pressure applying part 41, the clutch part 6 and the second pressure applying part 51 are aligned in this order in the axial direction. When the clutch part 6 is removed, the first pressure applying part 41 and the second pressure applying part 51 are disposed in opposition to each other.

The clutch center 5 has an approximately disc shape and includes the boss 52 in the middle part thereof. The boss 52 extends to protrude axially inside. The boss 52 includes an axially extending spline hole 52a in the middle part thereof. An input shaft of the transmission (not shown in the drawings) is engaged with the spline hole 52a. A thrust plate 14 is provided between the boss 52 and the middle part of the input gear 10. The clutch center 5 is not moved in the axial direction.

The clutch center 5 includes a plurality of recesses 53. The respective recesses 53 are recessed axially inside. The respective recesses 53 are aligned at intervals in the circumferential direction. An end of each urging member 8 is accommodated in each recess 53.

[Clutch Part]

The clutch part 6 includes at least one first clutch plate 61 and at least one second clutch plate 62. The first and second clutch plates 61 and 62 are disposed between the first pressure applying part 41 and the second pressure applying part 51. Transmission of power is allowed or blocked between the clutch housing 2 and the clutch center 5 through the first and second clutch plates 61 and 62. Both types of clutch plates 61 and 62 have annular shapes and are alternately disposed in the axial direction.

The at least one first clutch plate 61 is axially movable with respect to the clutch housing 2, while being non-rotatable relatively thereto. In other words, the at least one first clutch plate 61 is unitarily rotated with the clutch housing 2. Detailedly, each of the at least one first clutch plate 61 includes a plurality of engaging protrusions on the outer peripheral part thereof. The engaging protrusions protrude radially outward therefrom. The engaging protrusions are meshed with the cutouts 22a included in the tubular part 22 of the clutch housing 2. Friction members are attached to both surfaces of each of the at least one first clutch plate 61. The axially outermost one of the friction members attached to the at least one first clutch plate 61 is capable of being engaged by friction with the second pressure applying part 51 of the clutch center 5.

Each of the at least one second clutch plate 62 includes a plurality of engaging protrusions on the inner peripheral end thereof. The engaging protrusions protrude radially inward therefrom. The engaging protrusions are meshed with engaging grooves 43 included in the pressure plate 4 or the clutch center 5. Therefore, the at least one second clutch plate 62 is axially movable with respect to the pressure plate 4 or the clutch center 5, while being non-rotatable relatively thereto. In other words, the at least one second clutch plate 62 is unitarily rotated with the pressure plate 4 or the clutch center 5.

The first pressure applying part 41 presses the clutch part 6 axially outside. The first pressure applying part 41 is capable of being engaged by friction with the axially innermost one of the friction members attached to the first and second clutch plates 61 and 62. A clutch-on state (a power transmission allowed state) is made when the clutch part 6 is pressed by the first pressure applying part 41 and the second pressure applying part 51 while being interposed therebetween.

[Cam Mechanism]

As shown in FIG. 2, the cam mechanism 7 is configured to axially separate the lifter plate 3 and the clutch center 5 away from each other when the lifter plate 3 and the clutch center 5 are rotated relatively to each other.

The cam mechanism 7 includes the first cam parts 71 and the second cam parts 72. The first cam parts 71 are configured to be unitarily rotated with the lifter plate 3 and the pressure plate 4. The first cam parts 71 are integrated with the lifter plate 3. In other words, the first cam parts 71 are part of the lifter plate 3. The first cam parts 71 protrude axially inside. Additionally, the first cam parts 71 are gradually narrowed axially inside. The first cam parts 71 include the axially extending through holes 32, respectively. The bolts 15 extend inside the through holes 32, respectively.

Each first cam part 71 includes a first cam surface 711 and a second cam surface 712. In other words, the first cam surface 711 and the second cam surface 712 are included in the lifter plate 3. Detailedly, the first cam surface 711 is one of the circumferential end surfaces of each first cam part 71. On the other hand, the second cam surface 712 is the other of the circumferential end surfaces of each first cam part 71.

The first cam surface 711 is a slope. The first cam surface 711 tilts to face a first side in the circumferential direction. Additionally, the first cam surface 711 tilts to face axially inside. In other words, the first cam surface 711 tilts to face toward the pressure plate 4 in the axial direction. It should be noted that in the present exemplary embodiment, the first side in the circumferential direction means the right side in FIG. 2. The first cam surface 711 composes one of the circumferential end surfaces of each first cam part 71.

The second cam surface 712 is a slope. The second cam surface 712 tilts to face a second side in the circumferential direction. In other words, the second cam surface 712 faces oppositely to the first cam surface 711 in the circumferential direction. The second cam surface 712 faces the same side as the first cam surface 711 in the axial direction. Specifically, the second cam surface 712 tilts to face axially inside. In other words, the second cam surface 712 tilts to face toward the pressure plate 4 in the axial direction. It should be noted that in the present exemplary embodiment, the second side in the circumferential direction means the left side in FIG. 2. The second cam surface 712 composes the other of the circumferential end surfaces of each first cam part 71.

The second cam parts 72 are configured to be unitarily rotated with the clutch center 5. Detailedly, the second cam parts 72 are integrated with the clutch center 5. In other words, the second cam parts 72 are part of the clutch center 5. The second cam parts 72 are recessed axially inside. The second cam parts 72 are gradually narrowed axially inside. It should be noted that in the present exemplary embodiment, the second cam parts 72 penetrate the clutch center 5 in the axial direction. The first cam parts 71 are disposed in the second cam parts 72, respectively.

Each second cam part 72 includes a third cam surface 721 and a fourth cam surface 722. The third cam surface 721 and the fourth cam surface 722 are included in the clutch center 5. Detailedly, the third cam surface 721 is one of the circumferential inner wall surfaces of each second cam part 72. The fourth cam surface 722 is the other of the circumferential inner wall surfaces of each second cam part 72.

The third cam surface 721 is a slope. The third cam surface 721 tilts to face the second side in the circumferential direction. Additionally, the third cam surface 721 tilts to face axially outside. In other words, the third cam surface 721 tilts to face toward the lifter plate 3 in the axial direction.

The third cam surface 721 is opposed to the first cam surface 711. It should be noted that the third cam surface 721 may be disposed at an interval from the first cam surface 711, or alternatively, may be disposed in contact with the first cam surface 711. The third cam surface 721 composes one of the circumferential end surfaces of each second cam part 72.

When viewed in the axial direction, the first cam surface 711 and the third cam surface 721 are disposed to overlap with each other. It should be noted that the entirety of the first cam surface 711 and that of the third cam surface 721 may overlap with each other, or alternatively, part of the first cam surface 711 and that of the third cam surface 721 may overlap with each other.

The fourth cam surface 722 is a slope. The fourth cam surface 722 tilts to face the first side in the circumferential direction. In other words, the fourth cam surface 722 faces toward the third cam surface 721 in the circumferential direction. Additionally, the fourth cam surface 722 tilts to face axially outside. In other words, the fourth cam surface 722 tilts to face toward the lifter plate 3 in the axial direction.

The fourth cam surface 722 is opposed to the second cam surface 712. It should be noted that the fourth cam surface 722 may be disposed at an interval from the second cam surface 712, or alternatively, may be disposed in contact with the second cam surface 712. The fourth cam surface 722 composes the other of the circumferential end surfaces of each second cam part 72.

When viewed in the axial direction, the second cam surface 712 and the fourth cam surface 722 are disposed to overlap with each other. It should be noted that the entirety of the second cam surface 712 and that of the fourth cam surface 722 may overlap with each other, or alternatively, part of the second cam surface 712 and that of the fourth cam surface 722 may overlap with each other.

Figure 3:
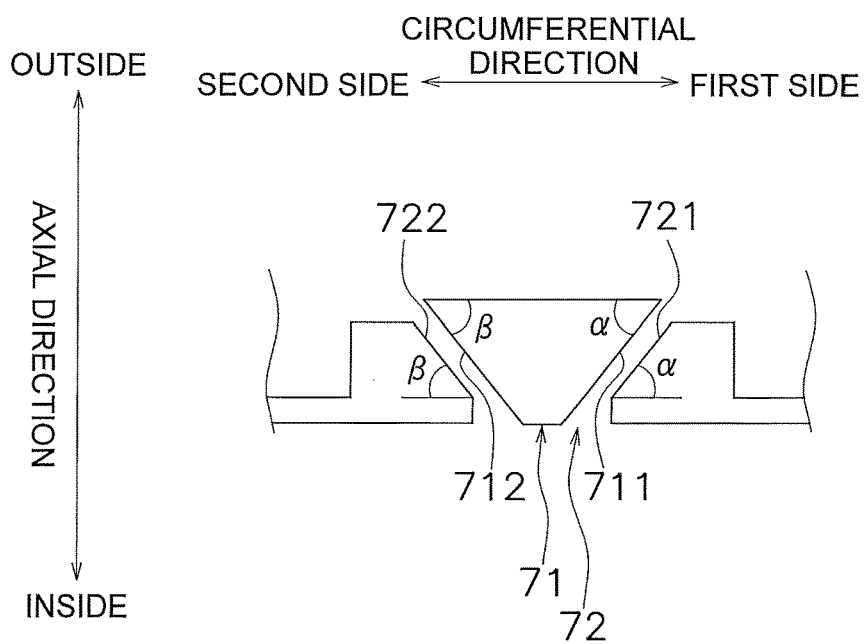
FIG. 3 is a schematic diagram of the cam mechanism.

As shown in FIG. 3, a tilt angle $\alpha$ of each of the first and third cam surfaces 711 and 721 relative to a plane arranged perpendicularly to the axial direction can be set to fall in a range of approximately 20 to 70 degrees. Likewise, a tilt angle $\beta$ of each of the second and fourth cam surfaces 712 and 722 relative to the plane arranged perpendicularly to the axial direction can be set to fall in a range of approximately 20 to 70 degrees. The tilt angle $\alpha$ of each of the first and third cam surfaces 711 and 721 is equal to the tilt angle $\beta$ of each of the second and fourth cam surfaces 712 and 722. It should be noted that the tilt angle $\alpha$ of each of the first and third cam surfaces 711 and 721 may be different from the tilt angle $\beta$ of each of the second and fourth cam surfaces 712 and 722. For example, the tilt angle $\beta$ of each of the second and fourth cam surfaces 712 and 722 can be set to be greater than the tilt angle $\alpha$ of each of the first and third cam surfaces 711 and 721. With this setting, in a condition that the clutch device 100 is rotated to the first side in the circumferential direction, for instance, a smaller clutch engaging force can be produced when a torque is inputted into the clutch device 100 from the clutch center 5 than when a torque is inputted into the clutch device 100 from the input gear 10.

[Urging Member]

As shown in FIGS. 1 and 2, the urging members 8 are disposed between the lifter plate 3 and the clutch center 5. The urging members 8 urge the lifter plate 3 and the clutch center 5 oppositely to each other in the axial direction. For example, the urging members 8 are coil springs.

[Actions]

Next, the action of the clutch device 100 will be explained. It should be noted that the clutch device 100 is assumed to be rotated to the first side in the circumferential direction. When a release operation is not being performed in the clutch device 100, the lifter plate 3 and the clutch center 5 are urged oppositely to each other by the urging members 8. The clutch center 5 is not moved in the axial direction. Hence, the lifter plate 3 is moved axially outside. The lifter plate 3 is coupled to the pressure plate 4. Hence, the pressure plate 4 is moved axially in the same direction as the lifter plate 3. In other words, the pressure plate 4 is moved axially outside. As a result, the clutch part 6 is pressed by the first pressure applying part 41 and the second pressure applying part 51 while being interposed therebetween, and the clutch part 6 is turned into the transmission allowed state.

In this state, a torque from the engine is inputted into the input gear 10 and the clutch housing 2, and is then transmitted to the clutch center 5 and the pressure plate 4 through the clutch part 6. Additionally, in conjunction with rotation of the first cam parts 71 together with the pressure plate 4, the first pressure applying part 41 and the second pressure applying part 51 hold the clutch part 6 with a greater force while interposing the clutch part 6 therebetween. Accordingly, the clutch engaging force is increased.

Detailedly, the first cam parts 71 are rotated relatively to the second cam parts 72 to the first side in the circumferential direction by the torque from the pressure plate 4. With this relative rotation, the first cam surfaces 711 and the third cam surfaces 721 are pressed against each other in the axial direction. As a result, the lifter plate 3 including the first cam surfaces 711 is moved axially outside. In conjunction with this movement of the lifter plate 3, the first pressure applying part 41 of the pressure plate 4 is moved toward the second pressure applying part 51 in the axial direction. As a result, the clutch engaging force is increased.

On the other hand, when a rider returns a throttle grip to reduce acceleration, the second cam parts 72 are rotated relatively to the first cam parts 71 to the first side in the circumferential direction by the torque from the clutch center 5. With this relative rotation, the second cam surfaces 712 and the fourth cam surfaces 722 are pressed against each other in the axial direction. As a result, the lifter plate 3 including the second cam surfaces 712 is moved axially outside. In conjunction with this movement of the lifter plate 3, the first pressure applying part 41 of the pressure plate 4 is moved toward the second pressure applying part 51 in the axial direction. As a result, the clutch engaging force is increased.

Next, when the rider squeezes a clutch lever, the operating force is transmitted to the release mechanism through a clutch wire and so forth. The lifter plate 3 is moved axially inside by the release mechanism against the urging force of the urging members 8. In conjunction with this movement of the lifter plate 3, the pressure plate 4 coupled to the lifter plate 3 is moved axially inside. Accordingly, pressure of the pressure plate 4 onto the clutch part 6 is released, and the clutch part 6 is turned into an off state. In this clutch-off state, rotation from the clutch housing 2 is not transmitted to the clutch center 5.

[Manufacturing Method]

An exemplary method of manufacturing the clutch device 100 configured as described above will be explained. First, the pressure plate 4 is prepared. Then, the clutch center 5 is disposed on the pressure plate 4. Specifically, the position of the clutch center 5 is aligned with respect to the pressure plate 4 such that each protrusion 42 of the pressure plate 4 extends between the third cam surface 721 and the fourth cam surface 722 of each second cam part 72.

Next, the urging members 8 are disposed in the recesses 53 of the clutch center 5, respectively. Thereafter, the lifter plate 3 is disposed above the clutch center 5. Detailedly, the lifter plate 3 is disposed such that the first cam parts 71 are disposed inside the second cam parts 72, respectively. More detailedly, the lifter plate 3 is disposed such that the screw holes 42a of the pressure plate 4 and the through holes 32 of the lifter plate 3 are aligned with each other. With this configuration, the first cam surfaces 711 are opposed to the third cam surfaces 721, respectively, whereas the second cam surfaces 712 are opposed to the fourth cam surfaces 722, respectively.

Then, the bolts 15 are inserted through the through holes 32 of the lifter plate 3, respectively, and are screwed into the screw holes 42a of the pressure plate 4, respectively. With this configuration, the lifter plate 3 and the pressure plate 4 are fixed to each other.

[Features]

According to the aforementioned clutch device 100, each first cam part 71 has a shape gradually narrowed axially inside, whereas each second cam part 72 has a shape gradually extended axially outside. Therefore, the minimum distance between the third cam surface 721 and the fourth cam surface 722 can be made smaller than the maximum distance between the first cam surface 711 and the second cam surface 712. Accordingly, the gap between the first cam surface 711 and the third cam surface 721 and that between the second cam surface 712 and the fourth cam surface 722 can be made small.

[Modifications]

One exemplary embodiment of the present invention has been described above. However, the present invention is not limited to the aforementioned exemplary embodiment, and a variety of changes can be made without departing from the scope of the present invention.

Modification 1

In the clutch device 100 according to the aforementioned exemplary embodiment, the clutch-off state is made by moving the lifter plate 3 axially inside. However, the present invention is also applicable to the clutch device 100 in which the clutch-off state is made by moving the lifter plate 3 axially outside.

Figure 4:
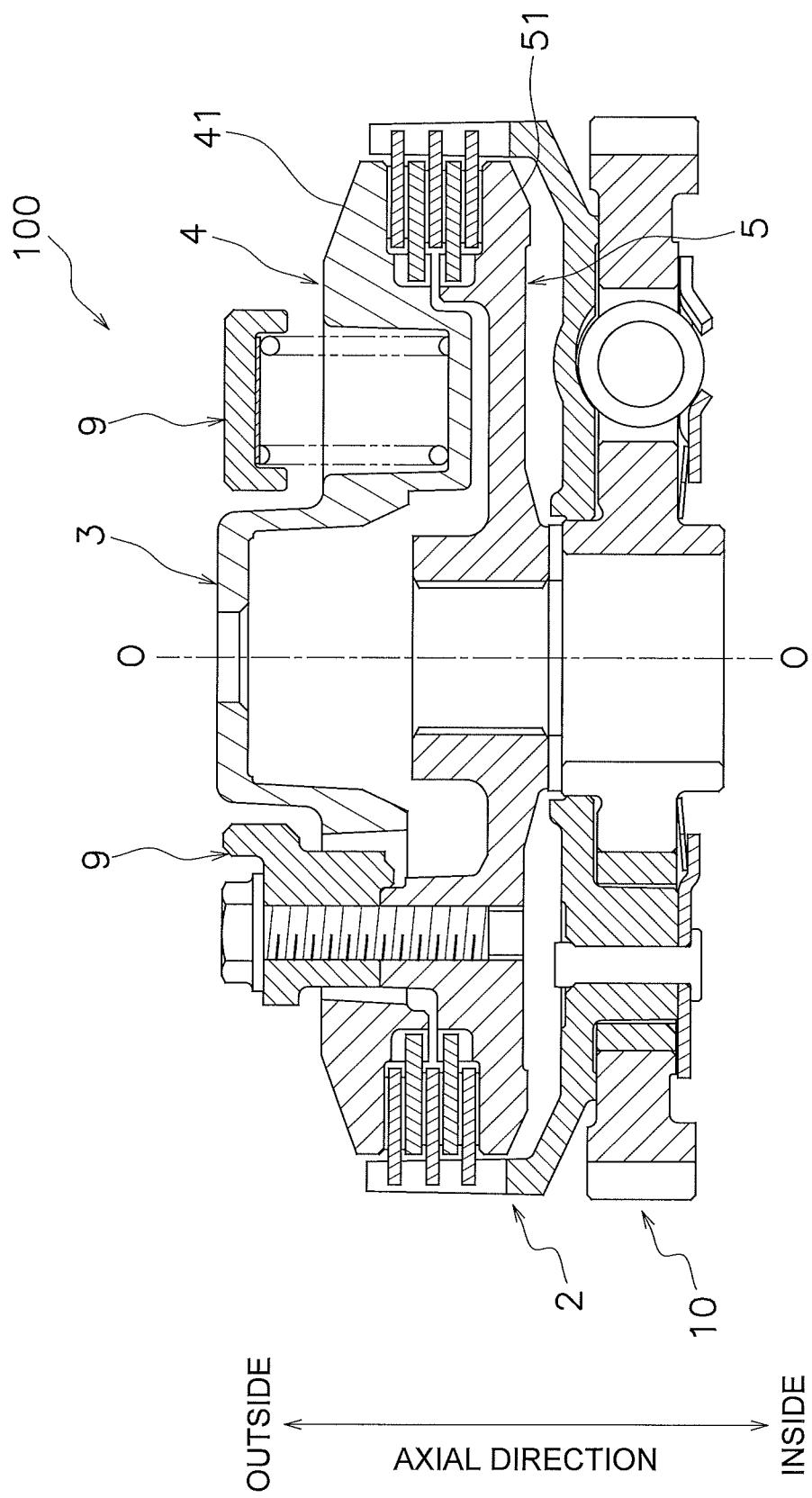
FIG. 4 is a cross-sectional view of a clutch device according to a modification.

FIG. 4 is a cross-sectional view of the clutch device 100 in which the clutch-off state is made by moving the lifter plate 3 axially outside. As shown in FIG. 4, in this clutch device 100, the pressure plate 4 is disposed axially outside the clutch center 5. In other words, the pressure plate 4 corresponds to the second rotary member of the present invention, whereas the clutch center 5 corresponds to the first rotary member of the present invention.

Not the lifter plate 3 but a support member 9 is unitarily rotated with the clutch center 5 provided as the first rotary member. Additionally, in the clutch device 100 according to modification 1, the lifter plate 3 does not have a function of the support member of the present invention. In other words, this clutch device 100 includes the support member 9 provided separately from the lifter plate 3, and the support member 9 corresponds to the support member of the present invention. Also, the support member 9 supports the urging members 8. It should be noted that the lifter plate 3 is integrated with the pressure plate 4.

The clutch center 5 includes a first pressure applying part 51. The first pressure applying part 51 faces axially outside. The pressure plate 4 includes a second pressure applying part 41. The second pressure applying part 41 faces axially inside. When the clutch part 6 is removed, the first pressure applying part 51 and the second pressure applying part 41 are opposed in the axial direction.

Figure 5:
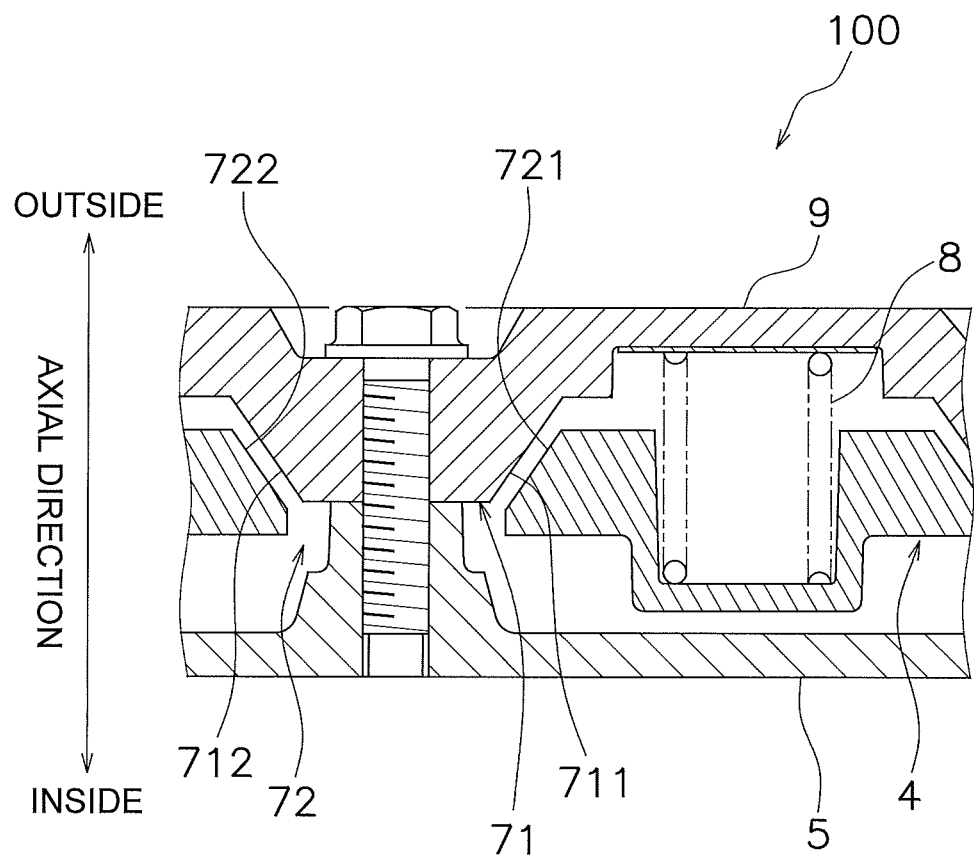
FIG. 5 is a cross-sectional view of a cam mechanism according to the modification.

As shown in FIG. 5, the first and second cam surfaces 711 and 712 are included in the support member 9. On the other hand, the third and fourth cam surfaces 721 and 722 are included in the pressure plate 4. It should be noted that the other configurations are similar to those of the aforementioned exemplary embodiment.

Modification 2

In the aforementioned exemplary embodiment, the coil springs are exemplified as the urging members 8. However, disc springs or so forth may be used instead of the coil springs.

Modification 3

In the aforementioned exemplary embodiment, the first cam parts 71 have been explained as part of the lifter plate 3. However, the first cam parts 71 may be discrete members from the lifter plate 3. On the other hand, the second cam parts 72 have been explained as part of the clutch center 5. However, the second cam parts 72 may be discrete members from the clutch center 5.

Modification 4

In the aforementioned exemplary embodiment, the lifter plate 3 and the pressure plate 4 are fixed to each other by the bolts 15. However, the lifter plate 3 and the pressure plate 4 may be fixed to each other by another type of fastener members.

REFERENCE SIGNS LIST

100 Clutch Device
3 Lifter plate
4 Pressure plate
5 Clutch center
6 Clutch part
7 Cam mechanism
71 First cam part
711 First cam surface
712 Second cam surface
72 Second cam part
721 Third cam surface
722 Fourth cam surface
9 Urging member

The invention claimed is:

1. A clutch device comprising:
a first rotary member including a first pressure applying part, the first rotary member disposed to be rotatable about a rotational axis;
a second rotary member including a second pressure applying part disposed at an interval from the first pressure applying part in an axial direction, the second rotary member disposed to be rotatable about the rotational axis, the second rotary member disposed outside the first rotary member in the axial direction;
a clutch part disposed between the first pressure applying part and the second pressure applying part, the clutch part configured to allow and block transmission of a power;
a support member disposed outside the second rotary member in the axial direction, the support member configured to be rotated unitarily with the first rotary member; and
a cam mechanism configured to separate the support member and the second rotary member away from each other in the axial direction when the support member and the second rotary member are rotated relatively to each other, wherein
the cam mechanism includes a first cam surface, a second cam surface, a third cam surface and a fourth cam surface, the first and second cam surfaces are included in the support member, the third and fourth cam surfaces are included in the second rotary member,
the first and second cam surfaces tilt to face away from the support member, the first and second cam surfaces tilt to face axially inside and face oppositely to each other in a circumferential direction, the third cam surface is opposed to the first cam surface, and the fourth cam surface is opposed to the second cam surface.

2. The clutch device according to claim 1, further comprising:

an urging member disposed between the second rotary member and the support member, the urging member for urging the second rotary member and the support member so as to separate the second rotary member and the support member away from each other in the axial direction.

3. The clutch device according to claim 1, wherein the first rotary member is a pressure plate movable in the axial direction, and the second rotary member is a clutch center immovable in the axial direction.

4. The clutch device according to claim 1, wherein the first rotary member is a clutch center immovable in the axial direction, and the second rotary member is a pressure plate movable in the axial direction.

5. The clutch device according to claim 1, wherein the support member includes a first cam part protruding axially inside, one of two circumferential end surfaces of the first cam part is the first cam surface, the other of the two circumferential end surfaces of the first cam part is the second cam surface, the second rotary member includes a second cam part recessed axially inside, one of two circumferential inner wall surfaces of the second cam part is the third cam surface, and the other of the two circumferential inner wall surfaces of the second cam part is the fourth cam surface.

* * * * *